May 16, 1961  H. R. WALKER  2,984,747
RADIANT ENERGY DETECTING AND COLLECTING APPARATUS
Filed Oct. 2, 1959  4 Sheets-Sheet 1
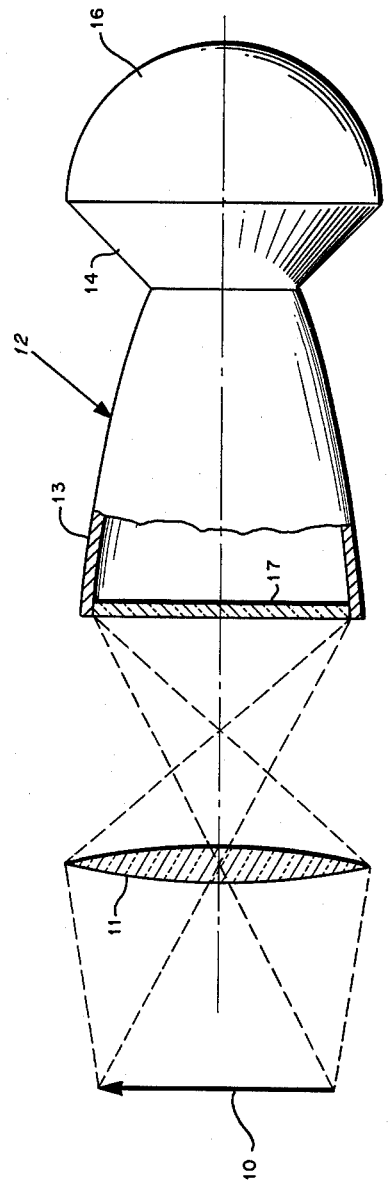
Fig. 1a
INVENTOR.
HAROLD R. WALKER
BY 
AGENT May 16, 1961 H. R. WALKER 2,984,747
RADIANT ENERGY DETECTING AND COLLECTING APPARATUS
Filed Oct. 2, 1959 4 Sheets-Sheet 2

INVENTOR.
HAROLD R. WALKER
BY
AGENT

May 16, 1961  H. R. WALKER  2,984,747
RADIANT ENERGY DETECTING AND COLLECTING APPARATUS
Filed Oct. 2, 1959  4 Sheets-Sheet 4

INVENTOR.
HAROLD R. WALKER
BY
AGENT

United States Patent Office 2,984,747
Patented May 16, 1961

2,984,747
RADIANT ENERGY DETECTING AND COLLECTING APPARATUS

Harold R. Walker, Warminster, Pa., assignor to the United States of America as represented by the Secretary of the Navy Filed Oct. 2, 1959, Ser. No. 844,149

7 Claims. (Cl. 250—83.3)

(Granted under Title 35, U.S. Code (1952), sec. 266)

The invention described herein may be manufactured and used by or for the Government of the United States of America for governmental purposes without the payment of any royalties thereon or therefor.

The present invention relates to a radiation detecting apparatus and more particularly to an infrared radiation detecting apparatus including a sensing element of the semi-conductor type wherein there is provided a radiation collector or funnel to improve the performance of the apparatus.

The sensitivity of infrared area scan systems vary with the squares of the aperture and field of view of the associated optical system. In infrared scanning systems utilized to detect a point source of infrared energy, a narrow field of view requires high scan rates which undesirably increases the band width requirements of the system. A straight forward solution to optimizing system parameters in terms of optical system aperture and field of view would result in a rather large sensor. However, the signal to noise ratio of infrared sensors of the semi-conductor type is a function of cell size. Maximum signal to noise ratio is obtained in cells of minimum size.

According to the present invention the above mentioned difficulty is overcome by utilizing a radiation collector or funnel comprising the portion of an ellipsoid extending between the plane of the minor axis and the plane of the latus rectum. The collector is located with respect to an optical system so that the plane of the minor axis coincides with the focal plane of the optical system. If desired the collector may be combined with at least a portion of an integrating sphere and the infrared sensor located approximately at the center thereof adjacent the plane of the latus rectum of the ellipsoidal collector.

Accordingly it is a general object of the present invention to provide an improved radiation detecting apparatus.

It is a further and more specific object of the present invention to improve the performance of infrared detecting apparatus which include an optical system and an infrared sensor of the semi-conductor type by providing a radiation collector or funnel located between the optical system and the sensor.

It is another and still more specific object of the present invention to provide in a radiation detecting apparatus, of the character described in the next preceding object, a radiation collector comprising the portion of an ellipsoid extending between the plane of the minor axis and the plane of the latus rectum.

Other objects and many of the attendant advantages of the invention will become better understood by reference to the following detailed description when considered in connection with the accompanying drawings wherein:

Figs. 1a and 1b illustrate an embodiment of the invention.

Figure 1B:
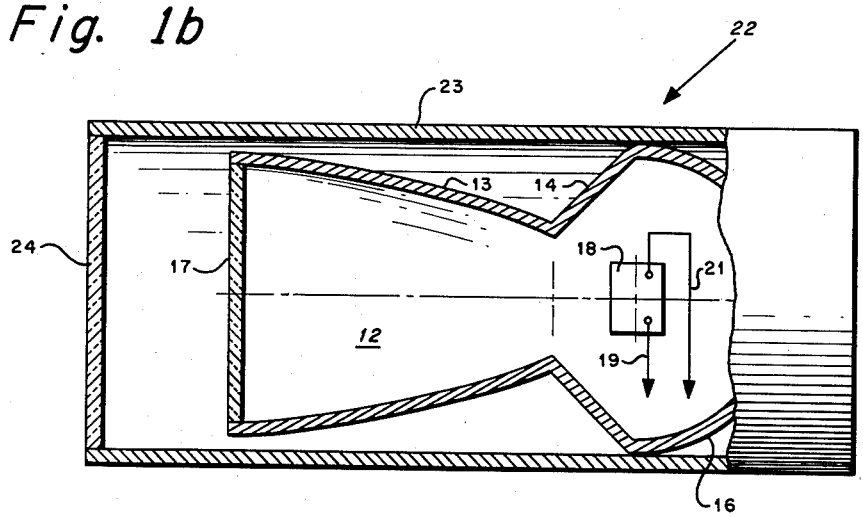

Referring now to Figs. 1a and 1b, there is shown an embodiment of the invention comprising an optical system 11 and a radiation collector 12.

Optical system 11 which may be of any convenient type is represented by a simple convergent lens.

Radiation collector 12 comprises the portion 13 of an ellipsoid extending between the plane of the minor axis and the plane of the latus rectum, which hereinafter may be respectively referred to as the collector aperture and collector focus.

Collector 12 is associated with optical system 11 so that the focal plane of the optical system coincides with the collector aperture whereby the image of an object 10 is focused at the entrance to the collector.

If desired a portion 16 of an integrating sphere may be appended to the collector by means of a portion 14 of a right circular cone extending from the collector focus to the integrating sphere. In a preferred embodiment of the invention the walls of the cone portion are inclined 45° to the major axis of the collector. As shown in Figs. 1a and 1b the aperture of radiation collector 12 may be closed by an infrared filter 17. In order to obtain optimum performance, the interior surfaces of collector 12 and appended parts should be highly polished or silvered.

An infrared sensor 18 which may be a germanium or silicon semi-conductive crystal is mounted by a means, not shown, adjacent the focus of collector 12 approximately at the center of hemispherical section 16. Signal leads 19, 21 may be affixed to sensor 18 by a thermocompression bond in order to minimize opaque areas on sensor 18.

The structure thus far described may be enclosed within a container 22 which may include a casing portion 23 and a radiation transparent window 24. Window 24 may be sealed to casing 23 if desired. Conventional means, not shown, may be provided to bring leads 19, 21 through casing 23 for connection to an external circuit. The structure for mounting collector 12 with respect to optical system 11 is not shown since the configuration thereof will depend upon the character of the optical system selected. In the simplest case, for example, casing 23 may be extended and provided with a conventional lens mounting to accommodate a rudimentary converging lens. In order to establish the ambient (zero signal) output from sensor 18, container 22, as is well known in the art, may be provided with a coolant chamber, not shown.

The mode of operation of the embodiment of the invention above described may be best understood by reference to the curves of Figs. 2 through 6 when considered with the following description.

Any radiation entering the aperture of collector 12 from optical system 11 within an acceptance angle, determined by the geometry of the optical system and the collector, will pass either directly or by reflection through collector 12 and impinge either directly or by reflection from hemispherical section 16 upon sensor 18. It may thus be seen that collector 12 performs a radiation collecting and condensing function while, as mentioned above, hemispherical section 16 performs an integrating function.

The above-mentioned acceptance angle is a function of the shape of ellipsoid portion 13 of collector 12 and, considering the radiation as occurring in a single plane, may be determined for any given ellipsoid from the standard equation of an ellipse:

$$(1) \quad \frac{X^2}{a^2}+\frac{Y^2}{b^2}=1$$

wherein $a$ designates the length of the major axis of the ellipse and $b$ designates the length of the minor axis thereof. Upon differentiation and simplification Equation 1 becomes $$(2) \quad \frac{dy}{dx}=\frac{bx}{a(a^2-x^2)^{1/2}}$$

where $$\frac{dy}{dx}$$

is the slope of a tangent to the ellipse at any value of X.

It may be shown that the acceptance angle is approximately equal to the maximum angle at which radiation may impinge upon any point on ellipsoid portion 13 and be reflected in a direction less than parallel to the latus rectum. Radiation impinging upon ellipsoid portion 13 at angles greater than the acceptance angle will be reflected back out of the collector. Since an ellipsoid is a symmetrical body, the solid acceptance angle may now easily be determined.

Radiation entering the collector at an angle slightly greater than the computed acceptance angle may pass through the collector without reflection. Accordingly, the actual acceptance angle in a practical system is slightly greater than the theoretical value defined above. Illustrative values of acceptance angle as a function of $a$ and $b$ are set forth in tabular form below.

Table I

| Length of Major Axis $a$ (Units) | Length of Minor Axis $b$ (Units) | Ratio of Major Axis to Minor Axis $\frac{a}{b}$ | Acceptance Angle $\alpha$ (Degrees) |
|---|---|---|---|
| 4 | 2 | 2 | 120 |
| 5 | 2 | 2.5 | 86 |
| 6 | 2 | 3 | 51 |
| 7 | 2 | 3.5 | 42 |
| 8 | 2 | 4 | 36 |

The usable aperture of optical system 11 for any given collector shape may be expressed in terms of the acceptance angle as follows:

$$(3) \quad f=\frac{1}{2\tan\frac{1}{2}\alpha}$$

where $\alpha$ designates the acceptance angle.

Figure 3:
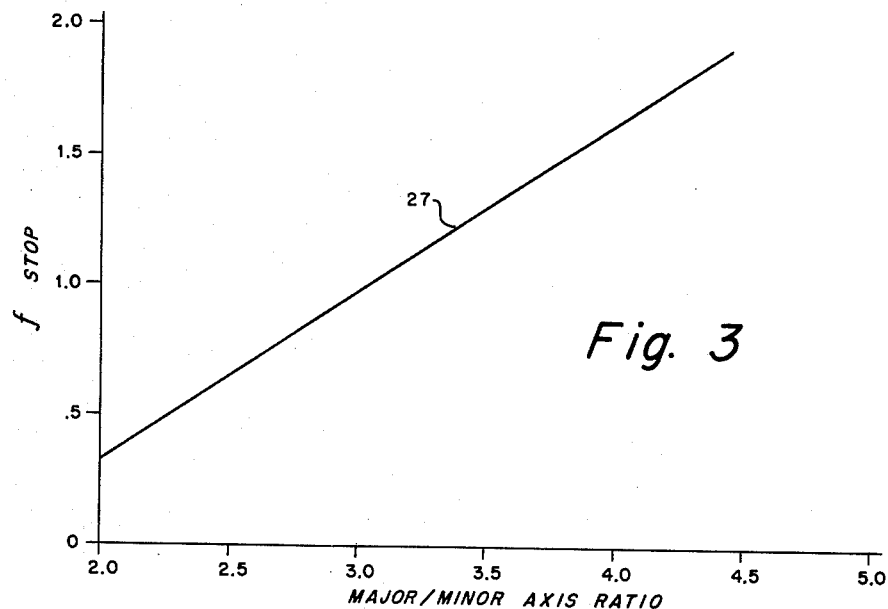
Fig. 3 is a graph of collector or funnel shape plotted as a function of optical system aperture.
Figure 2:
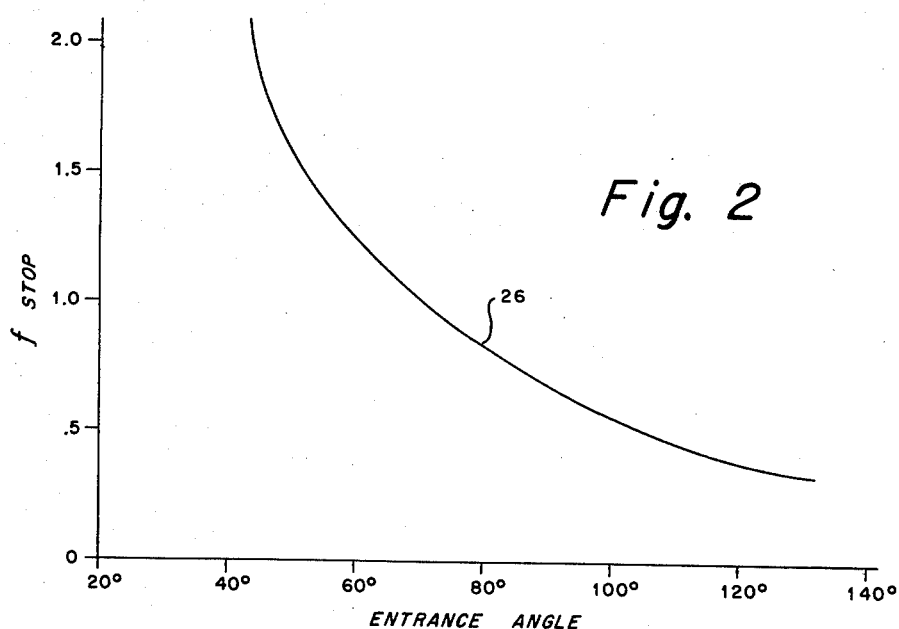
Fig. 2 is a graph of acceptance angle plotted as a function of optical system aperture.

The graphs of Figs. 2 and 3 respectively illustrate acceptance or entrance angle and collector shape plotted as a function of usable optical system aperture, where the collector shape is defined by the ratio of the length of the major axis to the length of the minor axis.

The gain of the collector may be expressed in terms of the concentration of energy effected by the collector and so expressed is approximately equal to the ratio of the area of the collector at the aperture to the area thereof at the focus (latus rectum):

$$(4) \quad G=\frac{\pi b^2}{\frac{\pi}{4}\left(\frac{2b^2}{a}\right)^2}$$

which upon simplification becomes:

$$(5) \quad G=\left(\frac{a}{b}\right)^2$$

Figure 4:
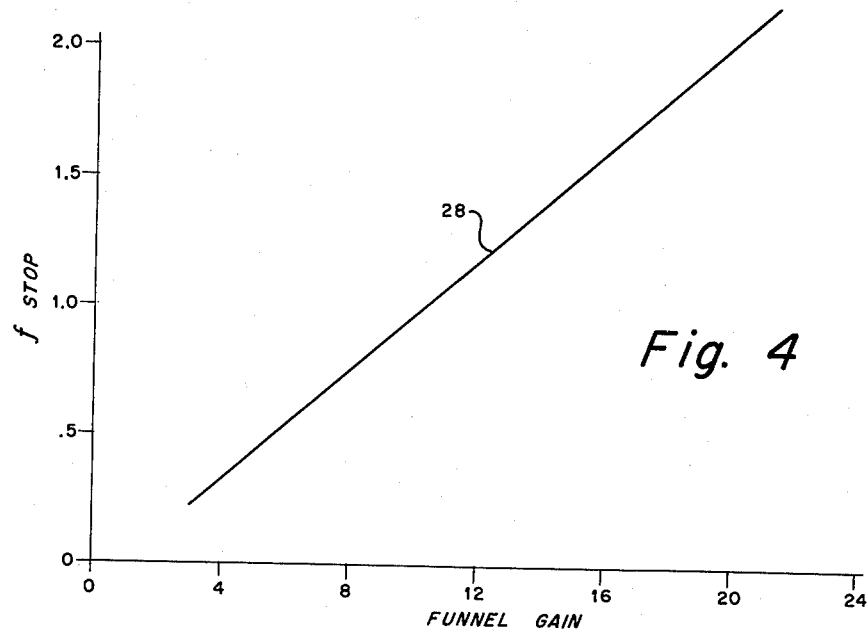
Fig. 4 is a graph of collector gain plotted as a function of optical system aperture.
Figure 5:
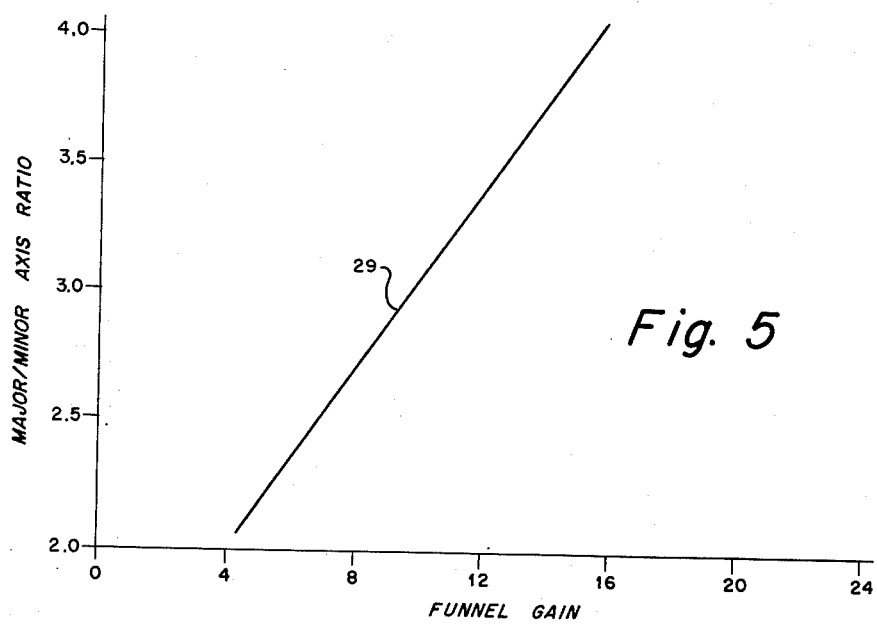
Fig. 5 is a graph of collector gain plotted as a function of collector shape.

The collector gain may also be expressed in terms of the aperture of the optical system using the relationships previously described. Figs. 4 and 5 graphically illustrate collector gain plotted respectively as a function of optical system aperture and collector shape.

Figure 6:
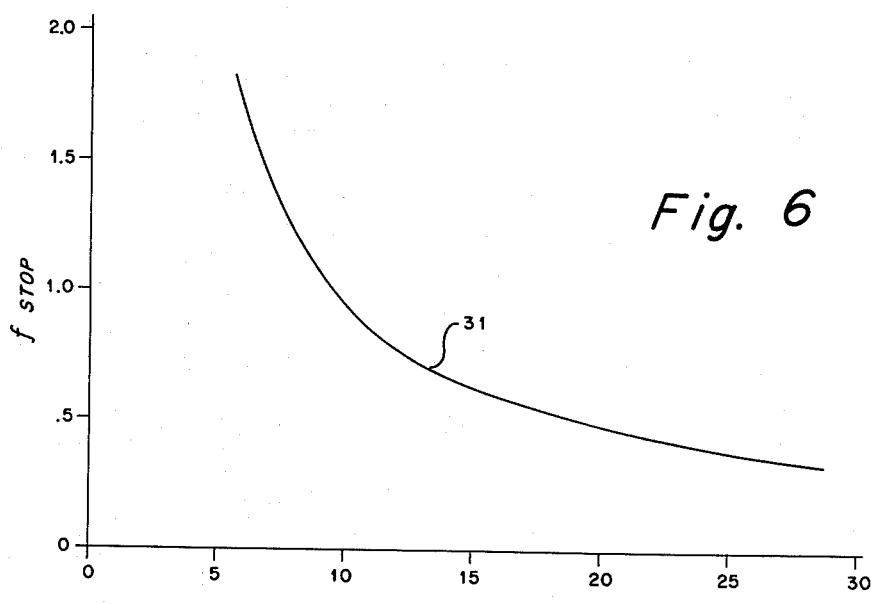
Fig. 6 is a graph of relative figure of merit referenced to an optical system aperture of f1.

A quantity, herein termed figure of merit, has been formulated in order to facilitate evaluation of the effect that increasing or decreasing optical system aperture has upon the overall performance of a radiation detecting apparatus constructed in accordance with the principles of the present invention. The figure of merit is referenced to $f1$ and determined according to the following relation.

$$\text{Figure of merit}=G\times\frac{1}{f^2}$$

where, as before, G is the collector gain. The graph of Fig. 6 is a plot of figure of merit as a function of optical system aperture.

Table 2 below tabulates illustrative values of the quantities discussed above.

Table 2

| $a$ | $b$ | Area Ratio or Power Gain | $f$ | Figure of Merit |
|---|---|---|---|---|
| 4 | 2 | 4 | .3 | .40 |
| 5 | 2 | 6.5 | .53 | 17.5 |
| 6 | 2 | 10 | 1.0 | 9.0 |
| 7 | 2 | 12.25 | 1.3 | 7.2 |
| 8 | 2 | 16 | 1.6 | 6.3 |

A radiation detecting apparatus including a novel radiation collector has been disclosed. While the invention has general utility, it is particularly useful when applied to infrared detecting apparatus employing sensors of the semi-conductor type.

Obviously many modifications and variations of the present invention are possible in light of the above teachings. It is therefore to be expressly understood that within the scope of the appended claims the invention may be practiced otherwise than as specifically described.

What is claimed is:

1. A radiation detecting apparatus comprising an optical system; a radiation collector comprising the portion of a hollow ellipsoid extending between the plane of the minor axis and the plane of the latus rectum; means mounting said collector with respect to said optical system whereby the plane of the minor axis of said collector coincides with the focal plane of said optical system; a portion of an integrating sphere; means comprising a portion of a hollow right circular cone joining said spherical portion to said collector at the plane of the latus rectum thereof; and a radiation sensitive element mounted approximately at the center of said integrating sphere adjacent the plane of the latus rectum of said collector.

2. The combination of claim 1 wherein said radiation sensitive element comprises an infrared sensor of the semi-conductor type.

3. The combination of claim 2 wherein an infrared filter is provided located between said optical system and said radiation collector.

4. The combination of claim 3 wherein the surfaces of said right circular cone portion are inclined approximately forty-five degrees to the major axis of said collector.

5. In a radiation detecting apparatus: a radiation collector comprising the portion of a hollow ellipsoid extending between the plane of the minor axis and the plane of the latus rectum; means forming an image of an object in the plane of the minor axis of said collector; and a radiation sensitive element mounted adjacent the plane of the latus rectum of said collector.

6. The combination of claim 5 wherein said radiation sensitive element comprises an infrared sensor of the semi-conductor type.

7. The combination of claim 6 wherein there is provided an infrared filter located in the plane of the minor axis of said collector.

References Cited in the file of this patent
UNITED STATES PATENTS

| | | |
|---|---|---|
| 2,027,595 | Knobel | Jan. 14, 1936 |
| 2,439,373 | Stearns | Apr. 6, 1948 |
| 2,444,442 | Herbold | July 6, 1948 |
| 2,692,982 | Metcalf | Oct. 26, 1954 |
| 2,707,900 | Maresh | May 10, 1955 |